United States Patent [19]

Bradley

[11] Patent Number: 5,122,334

[45] Date of Patent: Jun. 16, 1992

[54] ZIRCONIUM-GALLIUM ALLOY AND STRUCTURAL COMPONENTS MADE THEREOF FOR USE IN NUCLEAR REACTORS

[75] Inventor: Ellis R. Bradley, Pasco, Wash.

[73] Assignee: Sandvik Special Metals Corporation, Kennewick, Wash.

[21] Appl. No.: 659,882

[22] Filed: Feb. 25, 1991

[51] Int. Cl.$^5$ .............................. G21C 3/06
[52] U.S. Cl. .................... 376/457; 420/422
[58] Field of Search .......... 420/422; 75/612; 376/457

[56] References Cited

U.S. PATENT DOCUMENTS

| | | | |
|---|---|---|---|
| 3,294,529 | 12/1966 | Haverstraw et al. | 420/422 |
| 3,777,346 | 12/1973 | Steinemann | 420/422 X |
| 4,360,445 | 11/1982 | Mendelsohn et al. | 420/422 X |
| 4,938,920 | 7/1990 | Garzarolli et al. | 420/422 X |
| 4,938,921 | 7/1990 | Mardon et al. | 420/422 X |
| 4,963,316 | 10/1990 | Stehl et al. | 420/422 |
| 4,963,323 | 10/1990 | Matsuo et al. | 420/422 |
| 4,986,957 | 1/1991 | Taylor | 420/422 |
| 4,992,240 | 2/1991 | Komatsu et al. | 420/422 |

*Primary Examiner*—Deborah L. Kyle
*Assistant Examiner*—Daniel J. Jenkins
*Attorney, Agent, or Firm*—Burns, Doane, Swecker & Mathis

[57] ABSTRACT

A zirconium-base alloy including gallium in amounts effective to improve creep strength of the alloy. The Zr-base alloy can include up to 1 wt. % Ga, up to 0.5 wt. % oxygen, up to 1 wt. % Sn and up to 1 wt. % total of Fe, Cr and V. For instance, the alloy can include 0.5–0.5 wt. % Ga, 0.1–0.7 wt. % Sn, 0.1–0.5 wt. % Fe, 0.15–0.4 wt. % V, 0–0.5 wt. % Cr, 0.1–0.25 wt. % oxygen, balance Zr and unavoidable impurities. The alloy is particularly useful as a component of a fuel assembly such as a fuel tube.

33 Claims, No Drawings

ZIRCONIUM-GALLIUM ALLOY AND STRUCTURAL COMPONENTS MADE THEREOF FOR USE IN NUCLEAR REACTORS

FIELD OF THE INVENTION

The present invention relates to zirconium-base alloys and structural components made thereof for use in nuclear reactors.

BACKGROUND OF THE INVENTION

Various zirconium alloys are used as structural components in the nuclear industry. The most commonly used alloys, Zircaloy-2 and Zircaloy-4, contain strong alpha stabilizers tin and oxygen, plus the beta stabilizers iron, chromium and nickel. These alloys are generally forged in the beta region, then solution treated at about 1065° C. (1950° F.) and water quenched. Subsequent hot working and heat treating is done in the alpha region (below 790° C.) to preserve a fine, uniform distribution of intermetallic compounds which results from solution treating and quenching. Corrosion resistance in steam and hot water depends on the distribution of the intermetallic compounds.

Another significant commercial zirconium alloy is Zr-2.5Nb. The mechanical and physical properties of Zr-2.5Nb are similar to those of the Zircaloys but the corrosion resistance is slightly inferior to that of the Zircaloys.

In zirconium, the low-temperature alpha phase has a close-packed hexagonal crystal structure which transforms to a body-centered-cubic structure at about 870° C. (1600° F.). The transformation temperature is affected by even small amounts of impurities such as oxygen. Alpha-stabilizing elements raise the temperature of the allotropic alpha-to-beta transformation. The alpha-stabilizing elements include Al, Sb, Sn, Be, Pb, Hf, N, O and Cd. Beta-stabilizing elements lower the alpha-to-beta transformation temperature. Typical beta-stabilizers include Fe, Cr, Ni, Mo, Cu, Nb, Ta, V, Th, U, W, Ti, Mn, Co and Ag. Low-solubility intermetallic compound formers such as C, Si and P readily form stable intermetallic compounds and are relatively insensitive to heat treatment.

In addition to being an alpha-stabilizing element, oxygen is also used for solid-solution strengthening of zirconium. The oxygen content of Kroll process sponge generally varies from about 500 to 2000 ppm depending on the number of purification steps and the effectiveness of each step. Crystal bar zirconium generally contains less than 100 ppm oxygen. For instance, Table 5.10 of *The Metallurgy Of Zirconium*, by B. Lustman et al., McGraw-Hill Book Co., Inc., 1955, sets forth a typical analysis of Westinghouse crystal-bar zirconium having 200 ppm oxygen, 200 ppm Fe, 30 ppm Si, 30 ppm Al, 40 ppm Hf, less that 0.5 ppm Cu, 10 ppm Ti, less than 50 ppm Ca, less than 10 ppm Mn, less than 10 ppm Mg, less than 10 ppm Pb, less than 10 ppm Mo, 30 ppm Ni, 30 ppm Cr, less than 10 ppm Sn, 10 ppm N, 20 ppm H and 100 ppm C and elements not detected included Ga, Co, W, Au, Ag, Ta, Cb, B, V, P, Bi, Cd, Y, Yb, In, Ir, As, Os, Lu and Na.

Gallium is used predominantly in the electronics industry where it is combined with elements of Group III, IV or V of the periodic table to form semiconducting materials. Gallium in aluminum causes severe intergranular corrosion of the aluminum.

Zirconium alloys are disclosed in U.S. Pat. Nos. 3,148,055; 4,584,030; 4,707,330; 4,717,434; 4,751,045; 4,778,648; 4,810,461; 4,863,679; 4,908,071; 4,938,920; 4,938,921; and 4,963,316. U.S. Pat. No. 4,659,545 discloses a zirconium-based nuclear fuel rod cladding. U.S. Pat. No. 3,777,346 discloses a tension band for suspending rotatable mechanisms of measuring instruments, the tension bands being composed of Ti, Zr and Hf alloys which may also contain up to 15 atomic percent of non-transition metals such as Al, Sn, In, Ga or Cu.

SUMMARY OF THE INVENTION

The present invention provides a zirconium-base alloy having improved creep strength, the alloy comprising Zr and an amount of Ga effective to improve creep strength of the alloy. The alloy can contain up to 1 wt. % Ga. For instance, Ga can be present in amounts up to 0.5 wt. % or up to 0.25 wt. % such as 0.1 to 0.25 wt. %. According to one aspect of the invention, Ga is present in amounts of 0.25–0.5 wt. %.

The alloy can also contain oxygen. For instance, the oxygen content can be up to 0.5 wt. %. In particular, oxygen can be present in amounts of 0.1–0.25 wt. % or 0.12–0.18 wt. %.

The alloy can also include Sn. For instance, Sn can be present in amounts of up to 1 wt. %. In particular, Sn can be present in amounts of 0.1–0.7 wt. % or 0.25–0.5 wt. %.

The alloy can also contain at least one of Fe, Cr and V. For instance, the total amount of Fe, Cr and V can be up to 1 wt. %. In particular, Fe can be present in amounts of up to 0.5 wt. % such as 0.1–0.5 wt. % or 0.25–0.4 wt. %. Cr can be present in amounts of up to 0.5 wt. % such as 0.1–0.5 wt. % or 0.15–0.25 wt. %. V can be present in amounts of up to 0.5 wt. % such as 0.15–0.4 wt. % or 0.2–0.3 wt. %.

According to one aspect of the invention, the alloy consists essentially of 0.25–0.5 wt. % Ga, 0.1–0.25 wt. % oxygen, 0.1–0.7 wt. % Sn, 0.1–0.5 wt. % Fe, 0.15–0.4 wt. % V, 0–0.5 wt. % Cr, balance Zr and unavoidable impurities. For instance, the oxygen can be present in amounts of 0.12–0.18 wt. %, Sn can be present in amounts of 0.25–0.5 wt. %, Fe can be present in amounts of 0.25–0.4 wt. %, V can be present in amounts of 0.2–0.3 wt. % and Cr can be present in amounts of 0.15–0.25 wt. %.

In accordance with another aspect of the invention, a structural component for use in nuclear reactors is provided wherein the component comprises a zirconium-base alloy including an amount of Ga effective to improve creep strength of the alloy. The alloy can include up to 1 wt. % Ga, up to 0.5 wt. % oxygen, up to 1 wt. % Sn and up to 1 wt. % in total of Fe, Cr and V. More particularly, the alloy can consist essentially of 0.25–0.5 wt. % Ga, 0.1–0.25 wt. % oxygen, 0.1–0.7 wt. % Sn, 0.1–0.5 wt. % Fe, 0.15–0.4 wt. % V, 0–0.5 wt. % Cr, balance Zr and unavoidable impurities. The oxygen can be present in amounts of 0.12–0.18 wt. %, Sn can be present in amounts of 0.25–0.5 wt. %, Fe can be present in amounts of 0.25–0.4 wt. %, V can be present in amounts of 0.2–0.3 wt. % and Cr can be present in amounts of 0.15–0.25 wt. %. The structural component can comprise a component of a fuel assembly such as a fuel tube, spacers, springs, etc. In the case of a fuel tube, the alloy can be used with a Ga-free inner liner, such as a zirconium liner, or the tube can be liner-free in which case the entire tube can be of the Zr-Ga alloy.

DETAILED DESCRIPTION OF THE PREFERRED EMBODIMENTS

The present invention provides a novel zirconium-base alloy which has improved creep strength due to the addition of gallium. The improved creep strength is achieved without severely degrading the corrosion resistance of the alloy.

In the field of fuel tubing for nuclear reactor applications, such tubing is required to have a combination of good corrosion and mechanical properties for optimum performance. Zirconium alloys based on 0–0.5 wt. % Sn and various combinations of Fe, Cr and V show improved corrosion resistance compared to Zircaloy-4, but have extremely poor strength and creep properties. U.S. Pat. No. 4,584,030 (the disclosure of which is hereby incorporated by reference) discloses that the composition of Zircaloy-4 contains about 1.2–1.7 wt. % Sn, about 0.12–0.18 wt. % Fe and about 0.05–0.15 wt % Cr. U.S. Pat. No. 4,584,030 refers to U.S. Pat. No. 3,148,055 (the disclosure of which is hereby incorporated by reference) with respect to the composition of Zircaloy-4. U.S. Pat. No. 3,148,055 discloses a zirconium-base alloy containing 1.3–1.6 wt. % Sn, 0.07–0.12 wt. % Cr, 0.12–0.40 wt. % Fe, a maximum of 0.007 wt. % Ni, 0.16–0.25 wt. % oxygen, a maximum of 0.012 wt. % Si, a maximum of 0.05 wt. % C+N, balance Zr.

U.S. Pat. No. 4,938,920 (the disclosure of which is hereby incorporated by reference) discloses a zirconium-base alloy containing 0.10–0.16 wt. % oxygen, 0–1.0 wt. % Nb, 0–0.8 wt. % Sn, at least two metals from the group consisting of Fe, Cr and V having 0.2–0.8 wt. % Fe, 0–0.4 wt. % Cr and 0.3 wt. % V with a total Fe, Cr and V being 0.25–1.0 wt. % and a total of Nb and Sn being 0–1.0 wt. %. U.S. Pat. No. 4,938,920 discloses a specific zirconium-base alloy containing 0.25 wt. % Sn, 0.2 wt. % Fe, 0.15 wt. % V, 0.1 wt. % oxygen and less than 50 ppm Ni.

According to the invention, it has unexpectedly been discovered that small additions of Ga to zirconium-based alloys improves the creep strength of such alloys. In particular, additions of Ga of 0.25–0.5 wt. % to dilute zirconium-based alloys such as Sn containing zirconium-based alloys unexpectedly improves the creep strength of such alloys. For instance, it has been found that creep strains after approximately 300 hours exposure at 400° C. and 120 MPa stress are four to six times higher for alloys without gallium additions, as shown in Table 1. The corrosion resistance of the alloys according to the invention are equal to or better than standard Zircaloy-4 material as determined in a standard 400° C. autoclave test.

Table 1 establishes that alloys in accordance with the invention exhibit much lower creep stain compared to similar alloys without gallium additions and compared to Zircaloy-4. In addition, Table 1 establishes that the corrosion resistance of the alloys according to the invention are comparable to the corrosion resistance of Zircaloy-4 and to the corrosion resistance of similar alloys which do not include gallium. Accordingly, the gallium addition unexpectedly does not degrade corrosion resistance to an appreciable extent. The test results shown in Table 1 were measured after conducting a 400° C. autoclave test for 3 days, 28 days and 31 days.

TABLE 1

| ALLOY | COMPOSITION | CREEP TIME HRS. | CREEP STRAIN % | WEIGHT GAIN mg/dm$^2$ | | |
|---|---|---|---|---|---|---|
| | | | | 3 days | 28 days | 31 days |
| S1-V4 | .23% Fe, .20% V, .14% O | 311 | 3.95 | | 22.0 | |
| S4-6 | .24% Fe, .24% V, .23% O | 306 | 2.88 | 11.2 | | 23.9 |
| S4-10 | .26% Sn, .24% Fe, .25% V, .27% Ga, .17% O | 306 | 0.89 | 12.8 | | 26.0 |
| S2-3 | .53% Sn, .41% Fe, .20% Cr, .12% O | 311 | 8.36 | | 24.7 | |
| S4-7 | .50% Sn, .35% Fe, .18% Cr, .28% Ga, .11% O | 306 | 1.44 | 15.7 | | 28.9 |
| S4-8 | .47% Sn, .38% Fe, .18% Cr, .56% Ga, .11% O | 306 | 1.27 | 15.5 | | 28.4 |
| S4-9 | .53% Sn, .37% Fe, .19% Cr, .26% Ga, .17% O | 312 | 1.17 | | | 28.1 |
| Zircaloy-4 | | 317 | 0.45 | 13.6–17 | 29.1 | |

The alloys in Table 1 were tungsten electrode, arc melted into buttons and manufactured into strips by hot working and multiple steps of cold working with intermediate recrystallization anneals. The strips were finally annealed at 500° C. for 3.5 hours prior to testing. Conventional processing, such as disclosed in U.S. Pat. Nos. 3,148,055; 4,584,030; or 4,938,920 or the other patents mentioned in the Background of the Invention, can be used to manufacture fuel tubing made of the alloys of the invention. Due to the low melting temperature of Ga, additional steps may be necessary to achieve the desired compositions. For instance, the Ga can be combined with other ingredients in the form of a master alloy of Zr-Ga.

Compared to Zircaloy-2 and Zircaloy-4, alloys of the invention exhibit a similar microstructure with respect to the distribution of intermetallic particles. It is well known in the art, however, that the distribution and size of the intermetallic particles depends on the thermomechanical processing of the alloy as well as the alloy composition. The Ga in the alloys of the invention appears to contribute to solid solution strengthening of the alloy. This effect occurs even when the Ga is present in small amounts. Some of the Ga may be in particle form such as in the form of precipitates.

While the invention has been described with reference to the foregoing embodiments, various changes and modifications may be made thereto which fall within the scope of the appended claims.

What is claimed is:

1. A zirconium-base alloy having improved creep strength, comprising Zr and an amount of Ga effective to improve creep strength of the alloy, Ga being present in amounts up to 1 wt.%.

2. The alloy of claim 1, wherein Ga is present in amounts up to 0.5 wt. %.

3. The alloy of claim 1, wherein Ga is present in amounts up to 0.25 wt. %.

4. The alloy of claim 1, wherein Ga is present in amounts of 0.1–0.25 wt. %.

5. The alloy of claim 1, wherein Ga is present in amounts of 0.25–0.5 wt. %.

6. The alloy of claim 1, further comprising up to 0.5 wt. % oxygen.

7. The alloy of claim 6, wherein oxygen is present in amounts of 0.1–0.25 wt. %.

8. The alloy of claim 6, wherein oxygen is present in amounts of 0.12–0.18 wt. %.

9. The alloy of claim 1, further comprising up to 1 wt. % Sn.

10. The alloy of claim 9, wherein Sn is present in amounts of 0.1–0.7 wt. %.

11. The alloy of claim 9, wherein Sn is present in amounts of 0.25–0.5 wt. %.

12. The alloy of claim 1, further comprising at least one of Fe, Cr and V in a total amount of up to 1 wt. %.

13. The alloy of claim 12, wherein Fe is present in amounts up to 0.5 wt. %.

14. The alloy of claim 12, wherein Fe is present in amounts of 0.1–0.5 wt. %.

15. The alloy of claim 12, wherein Fe is present in amounts of 0.25–0.4 wt. %.

16. The alloy of claim 12, wherein Cr is present in amounts up to 0.5 wt. %.

17. The alloy of claim 12, wherein Cr is present in amounts of 0.1–0.5 wt. %.

18. The alloy of claim 12, wherein Cr is present in amounts of 0.15–0.25 wt. %.

19. The alloy of claim 12, wherein v is present in amounts up to 0.5 wt. %.

20. The alloy of claim 12, wherein V is present in amounts of 0.15–0.4 wt. %.

21. The alloy of claim 12, wherein V is present in amounts of 0.2–0.3 wt. %.

22. The alloy of claim 5, further comprising 0.1–0.25 wt. % oxygen, 0.1–0.7 wt. % Sn, 0.1–0.5 wt. % Fe, 0.15–0.4 wt. % V, 0–0.5 wt. % Cr, balance Zr and unavoidable impurities.

23. The alloy of claim 22, wherein oxygen is present in amounts of 0.12–0.18 wt. %, Sn is present in amounts of 0.25–0.5 wt. %, Fe is present in amounts of 0.25–0.4 wt. %, V is present in amounts of 0.2–0.3 wt. %, and Cr is present in amounts of 0.15–0.25 wt. %.

24. A structural component for use in nuclear reactors and made of a zirconium-base alloy, the alloy including an amount of Ga effective to improve creep strength of the alloy, Ga being present in amount up to 1 wt.%.

25. The structural component of claim 24, wherein the alloy includes up to 1 wt. % Ga, up to 0.5 wt. % oxygen, up to 1 wt. % Sn and up to 1 wt. % in total of Fe, Cr and V.

26. The structural component of claim 24, wherein the alloy consists essentially of up to 0.5 wt.% Ga, 0.1–0.25 wt. % oxygen, 0.1–0.7 wt. % Sn, 0.1–0.5 wt. % Fe, 0.1–0.5 wt. % V, 0–0.5 wt. % Cr, balance Zr and unavoidable impurities.

27. The structural component of claim 26, wherein oxygen is present in amounts of 0.12–0.18 wt. %, Sn is present in amounts of 0.1–0.3 wt. %, Fe is present in amounts of 0.25–0.4 wt. %, V is present in amounts of 0.15–0.35 wt. %, and Cr is present in amounts of 0–0.25 wt. %.

28. The structural component of claim 24, wherein the alloy consists essentially of up to 0.5 wt.% Ga, 0.1–0.25 wt. % oxygen, 0.1–0.7 wt. % Sn, 0.1–0.5 wt. % Fe, 0–0.5 wt. % V, 0.1–0.5 wt. % Cr, balance Zr and unavoidable impurities.

29. The structural component of claim 28, wherein oxygen is present in amounts of 0.12–0.18 wt. %, Sn is present in amounts of 0.1–0.3 wt. %, Fe is present in amounts of 0.25–0.4 wt. %, V is present in amounts of 0–0.25 wt. %, and Cr is present in amounts of 0.1–0.3 wt. %.

30. The structural component of claim 24, wherein the structural component comprises a fuel tube.

31. The structural component of claim 30, wherein the fuel tube is liner-free.

32. The structural component of claim 30, wherein the fuel tube includes a Ga-free inner liner of zirconium.

33. The structural component of claim 24, wherein the structural component comprises a component of a fuel assembly.

* * * * *